June 16, 1964 W. W. BLASE ETAL 3,137,309
FRICTIONLESS ZERO SPRING RATE SEAL
Filed April 30, 1962 4 Sheets-Sheet 1
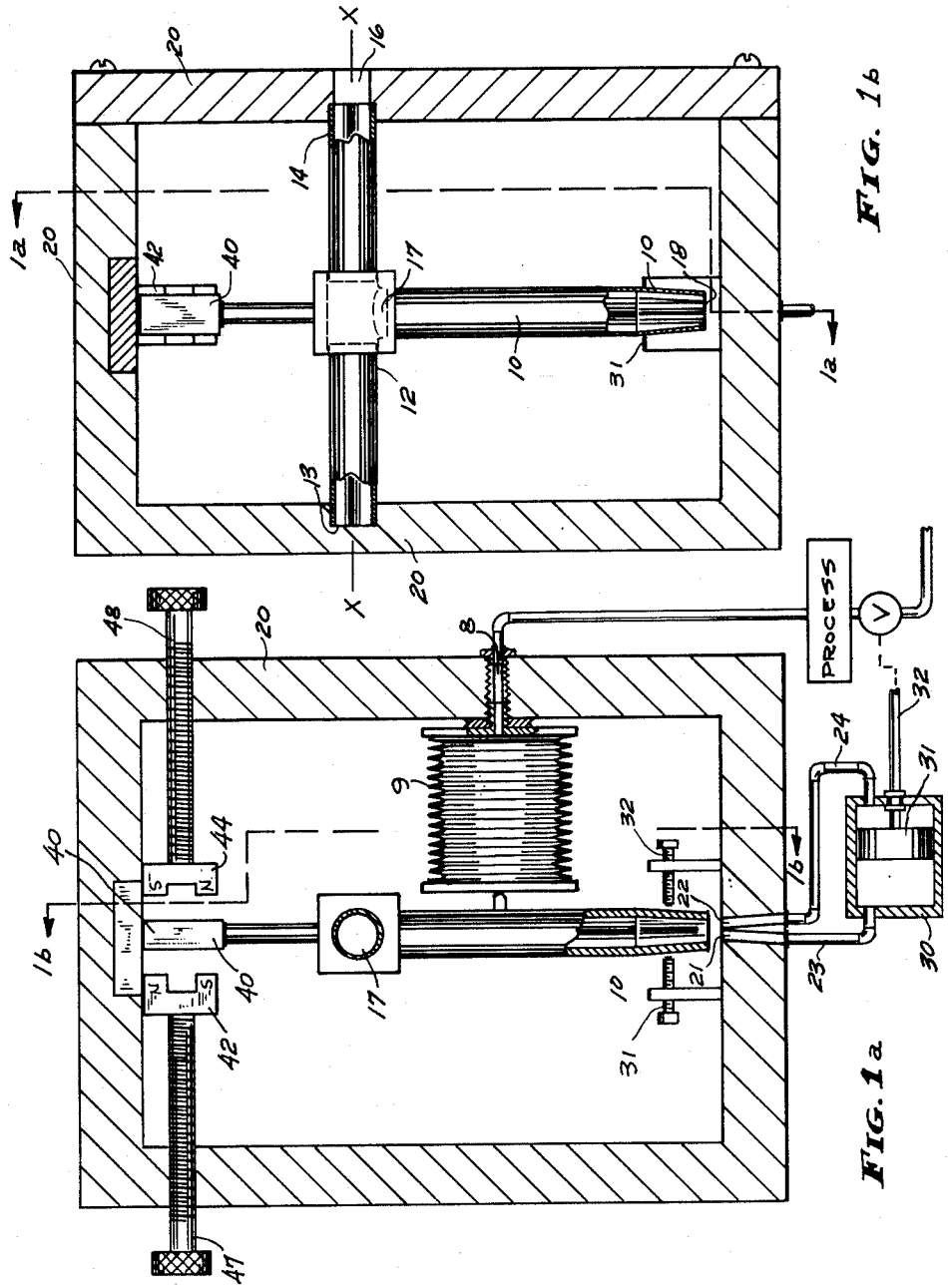
WILLIAM W. BLASE
JAMES H. KOGEN
INVENTORS
BY Richard L. Stephens
ATTORNEY June 16, 1964  W. W. BLASE ETAL  3,137,309
FRICTIONLESS ZERO SPRING RATE SEAL
Filed April 30, 1962  4 Sheets-Sheet 2

WILLIAM W. BLASE
JAMES H. KOGEN
INVENTOR

BY Richard L. Stephens
ATTORNEY

June 16, 1964   W. W. BLASE ETAL   3,137,309
FRICTIONLESS ZERO SPRING RATE SEAL
Filed April 30, 1962   4 Sheets-Sheet 3
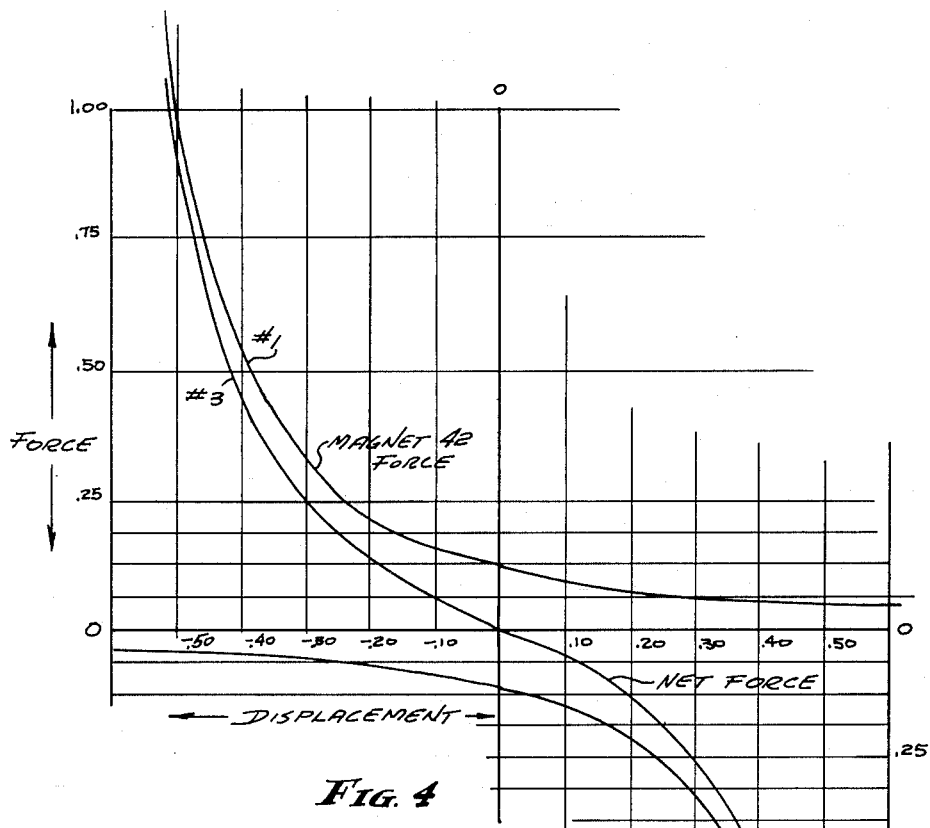
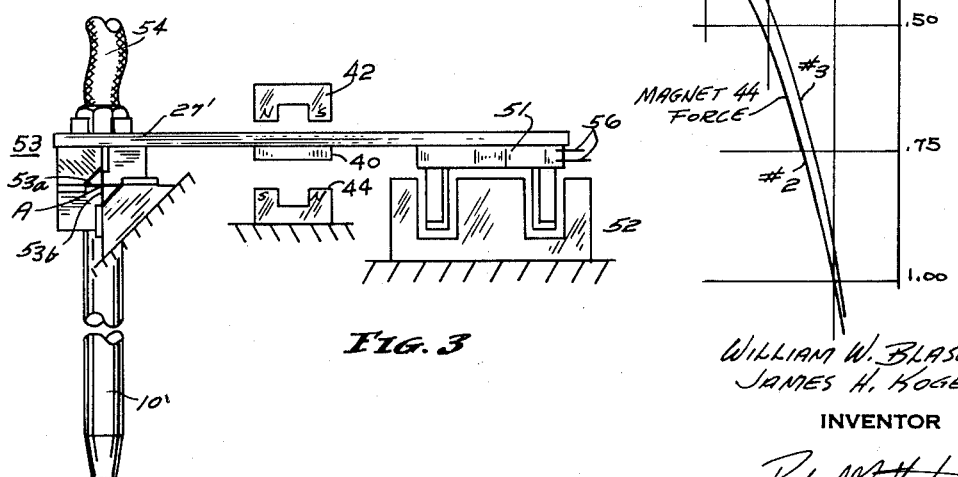
WILLIAM W. BLASE
JAMES H. KOGEN
INVENTOR
BY
ATTORNEY

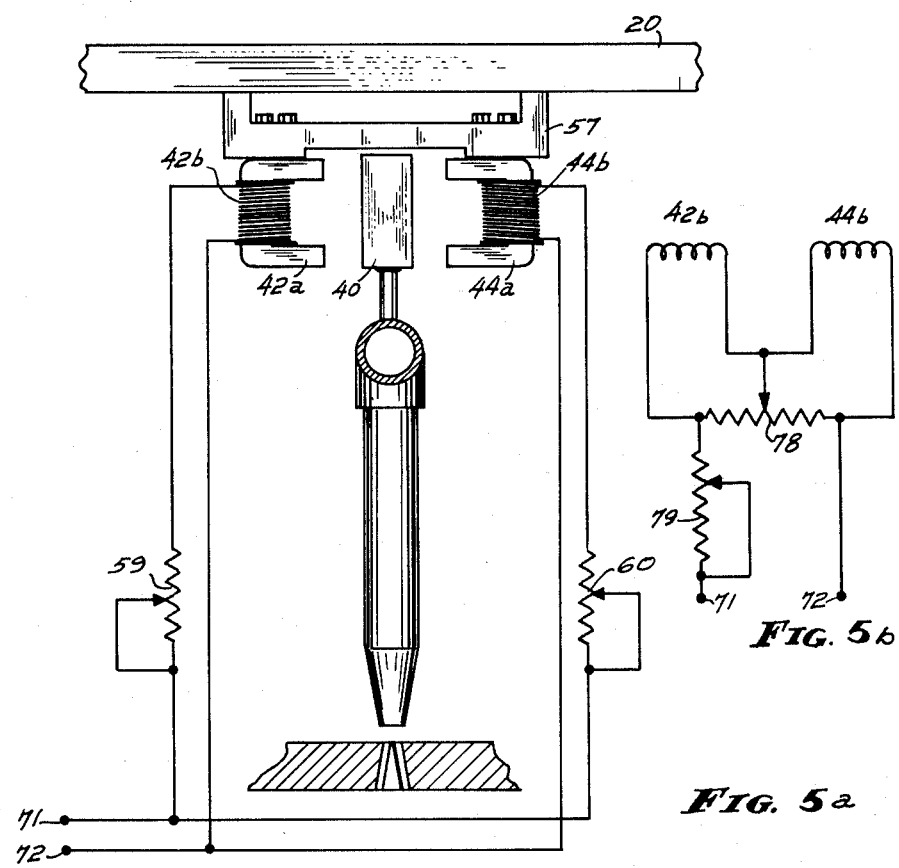
FIG. 5b
FIG. 5a
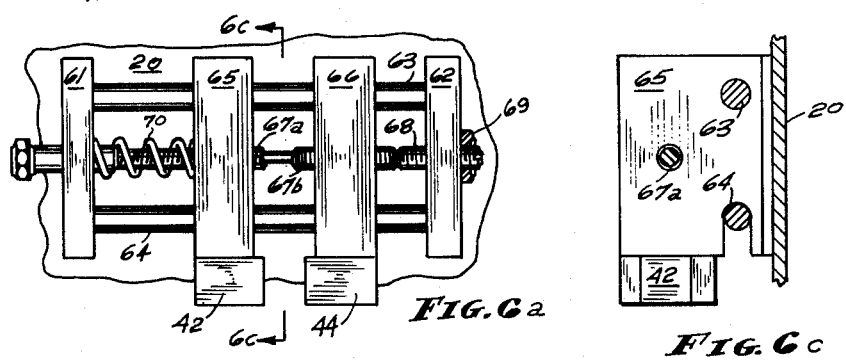
FIG. 6a
FIG. 6c
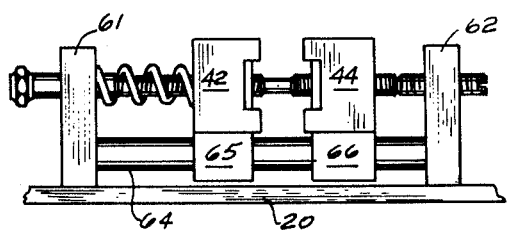
FIG. 6b
WILLIAM W. BLASE
JAMES H. KOGEN
INVENTOR
BY Richard L. Stephens
ATTORNEY United States Patent Office 3,137,309
Patented June 16, 1964

3,137,309
FRICTIONLESS ZERO SPRING RATE SEAL
William Walter Blase, Chicago, and James H. Kogen, Evanston, Ill., assignors to Link Division, General Precision, Inc., Binghamton, N.Y., a corporation of New York
Filed Apr. 30, 1962, Ser. No. 190,838
16 Claims. (Cl. 137—83)

This invention relates to pressure seals, and more particularly, to devices for sealing hydraulic or pneumatic fluid pressures within a movable device which must be capable of limited motion with minimum friction and minimum opposing spring forces. In the automatic control arts, various types of hydraulic and pneumatic amplifying and regulating apparatus utilize the positions of such movable devices to control the operation and determine the output from the apparatus. For example, in the well known jet pipe regulator, an input signal force or displacement is used to determine the position of a rotary jet pipe with respect to two receiving ports and thereby proportion receipt of fluid being expelled at high pressure from the jet pipe between the two receiver ports, thereby providing a pressure difference between the two ports. The pressure difference, which usually is far greater than the force required to position the jet pipe, may be used to control a valve or other load, with a feedback connection commonly made from the load to the jet pipe. In order to make such a hydraulic amplifier sensitive to very small or weak input signals, it is necessary that the jet pipe be mounted to rotate or pivot with minimum static friction and minimum moving friction. In order to connect a stationary, high pressure fluid source to such a pivotable jet pipe and still allow the jet pipe to pivot with minimum friction, the use of sealed flexure pivots has many advantages over packing boxes and other high-friction types of high pressure seals, as explained in detail in U.S. Patent No. 2,724,397 issued November 22, 1955 to Herbert Ziebolz. While such use of flexure-type connections may be used to provide substantially frictionless and totally sealed connections between a stationary high pressure source and a movable jet pipe, the opposing spring forces applied to the jet pipe by such flexure-type seals are frequently considerable in magnitude, making the jet pipe amplifier response undesirably insensitive to weak input signals. Ideally such flexure pivot seals should offer no resistance to jet pipe movement. The invention provides means for compensating or cancelling out the flexure connection spring forces, so that only greatly reduced or insignificant spring forces oppose the input error signals applied to the jet pipe, thereby making the jet pipe amplifier much more sensitive to small error signals.

In such jet pipe amplifier systems, adjustable biasing springs are frequently utilized to determine the position of the jet pipe with respect to the receiver ports during zero input signal conditions and thereby determine the system "set point." As different spring rates have been required in such prior art systems to provide different system gain factors, it usually has been necessary to substitute different biasing springs. The invention not only allows continuous spring rate adjustment without substitution of biasing springs, but even allows such springs to be eliminated while still providing continuously adjustable system gain.

Briefly described, the invention contemplates the use of bi-directional magnet means which provides magnetic forces to oppose the spring forces applied to the jet pipe by the flexure-type high pressure seal connections. Thus it is a primary object of the present invention to provide an improved high pressure seal connection between a stationary member and a movable member, so that friction and spring forces do not oppose motion of the movable member.

It is a more specific object of the invention to provide magnetic means for compensating or cancelling spring forces which resist motion of a member which is connected by a flexure-type high pressure seal to be movable bidirectionally with respect to a stationary member.

It is an additional object of the invention to provide a jet pipe amplifier assembly having improved set point adjusting means, the spring rate of which may be adjusted continuously in a simple and accurate manner.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 1a and 1b are a pair of orthogonally-related views illustrating one simple form of the invention, with certain parts cut away for ease of illustration;

FIG. 3 is a section view of a further embodiment of the invention;

FIG. 4 is a graph useful in understanding the operation of the invention; and

FIGS. 5 and 5b are modified embodiments of the invention which utilize electromagnetic bi-directional spring-rate compensating means.

FIGS. 6a, 6b and 6c are a trio of orthogonal views illustrating an exemplary magnet positioning arrangement useful in many embodiments of the invention.

Figure 2A:
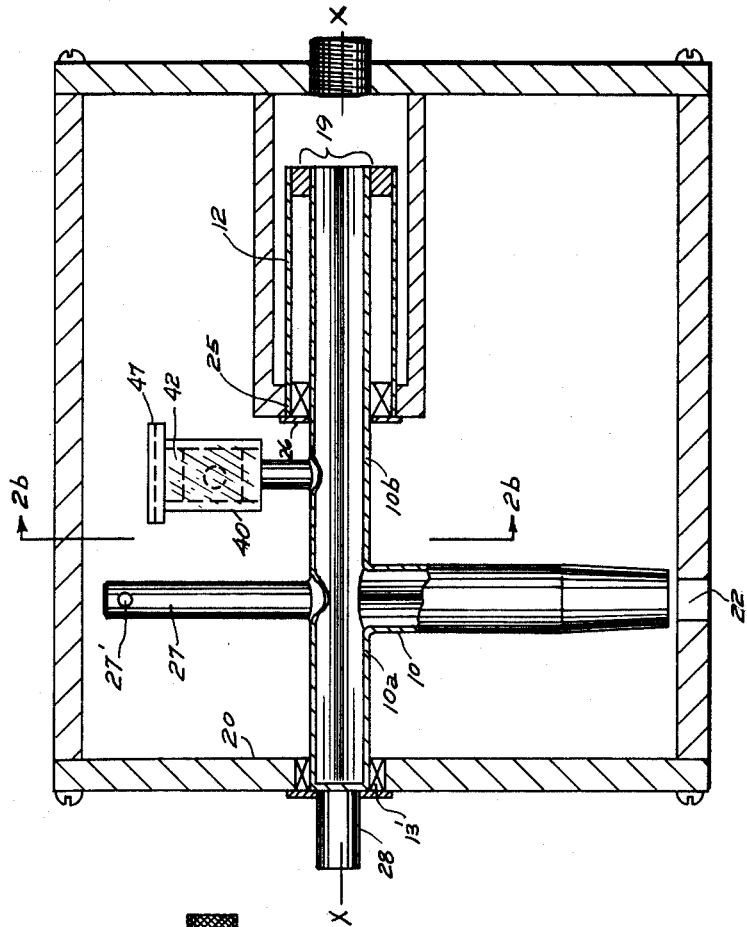
FIGS. 2a and 2b are a similar pair of views illustrating a modified form of the invention.

In FIGS. 1a and 1b jet pipe 10 is shown supported by a transversely-connected hollow torque tube 12 which is fixedly mounted to the stationary body 20 of the jet pipe assembly at each of ends 13, 14 of torque tube 12, with ends 13, 14 sealed to body 20 and non-rotatable with respect to body 20. Input signal forces are applied by means shown as comprising a pressure-operated expansible bellows 9, one end of which is fixedly attached to jet pipe 10 and the other end of which is fixedly attached to housing 20. Threaded passage 8 allows a pressure to be sensed to be connected to the interior of bellows 9, so that variation of the pressure applied to bellows 8 operates to extend or retract bellows 9, thereby operating to rotate jet pipe 10 about axis x—x. Fluid from a high pressure source (not shown) is connected through passage 16 to flow through hollow tube 12, through an opening 17 in tube 12 into jet pipe 10, and then out through nozzle end 18 of jet pipe 10. If desired, a passageway similar to 16 may be provided to end 13 of tube 12 to supply the high pressure fluid to both ends of the tube. Tube 12, being rigidly attached to body 20 at its ends, applies an opposing torque to jet pipe 10 which tends to center jet pipe 10 in a free "center" position, and in assembly of the unit, the ends of tube 12 are fastened with nozzle 18 centered with respect to ports 21, 22, so that in the absence of any applied external force the jet pipe 10 will be centered between the ports. Sometimes it is desired to bias the jet pipe to a different "zero position." In order to adjust the jet pipe zero position, and thereby determine the "set point" of the system in which the jet pipe amplifier is used, it is common to provide springs which may be adjusted to provide different set points. Frequently it is desirable to be able to adjust the spring rate of set point biasing springs, and the most common way of providing such adjustment in the prior art has been to substitute different springs having different spring constants. The invention allows adjustment of both the set point and the spring rate without the necessity of changing springs, and in many applications of the invention allows such springs to be omitted altogether. Irrespective of the direction in which jet pipe 10 is deflected, it will be seen that tube 12 will provide a torsional restoring force in a direction tending to center the jet pipe. The invention serves to decrease or substantially eliminate that restoring force.

Fluid expelled at high velocity from nozzle 18 of jet pipe 10 is directed toward and enters receiver ports 21, 22, which are connected by means shown schematically as comprising conduits 23, 24 to opposite ends of a hydraulic motive means shown as comprising cylinder 30 and piston 31. If jet pipe 10 is directed so as to discharge fluid equally to ports 21 and 22, equal pressure will exist on opposite sides of piston 31 and the piston will remain stationary. If jet pipe 10 is rotated or pivoted very slightly about axis x—x, however, the decrease of pressure on one side of piston 31 and simultaneous increase of pressure on the other side will immediately tend to translate piston 31, and an external load attached to piston rod 32. In a typical application of the invention, the load, such as valve V, controls an operating condition of a process or a machine in a manner to affect the pressure applied to bellows 9, or alternatively, to derive a force or displacement signal which may be otherwise mechanically connected to jet pipe 10.

Rigidly attached to jet pipe 10, preferably on the end of jet pipe 10 opposite from nozzle 18 is a magnetic armature element 40, formed of soft iron, for example. As jet pipe 10 is rotated about axis x—x, armature element 40 is translated between a pair of magnetic force-producing means shown as comprising a pair of similar, but oppositely disposed permanent magnets 42, 44 which are rigidly though adjustably mounted to the jet pipe amplifier body 20 by means shown as comprising adjusting screws 47, 48 to the ends of which magnets 42, 44 are rotatably attached. Considering only the forces applied to jet pipe 10 by magnets 42 and 44, it will be seen that the central or zero position of jet pipe 10, that position shown in FIG. 1a, is a position of unstable equilibrium, since magnets 42 and 44 exert equal and opposite attractive forces on armature 40, thereby providing no net rotational moment on jet pipe 10. As jet pipe 10 is rotated about the x—x axis, however, armature 40 will be seen to move nearer one of the magnets and farther away from the other of the magnets, increasing the attractive force applied by the magnet the armature approaches, and decreasing the attractive force applied by the other magnet. Thus it will be seen that deflection of jet pipe 10 in a given direction results in a restoring force from the torque tube tending to re-center the jet pipe but also an oppositely-acting magnetic force tending to further deflect the jet pipe away from its center position. By selection of the strength and spacing of the magnets, one may cause the magnetic forces substantially to cancel out the spring forces of torsion tube, so that the jet pipe can be swung not only frictionlessly but substantially without spring restraint over its required range of deflection in either direction. Adjustable stops 31, 32 serve to limit rotation of jet pipe 10 to within the operating range of bellows 9 and so that some of the fluid being expelled from the jet pipe always enters one or the other of ports 21, 22. Stops 31, 32 by limiting rotating of jet pipe 10, also limit the travel of armature 40 in the air gap between magnets 42, 44, for a purpose to be explained below in connection with FIG. 4.

Figure 2B:
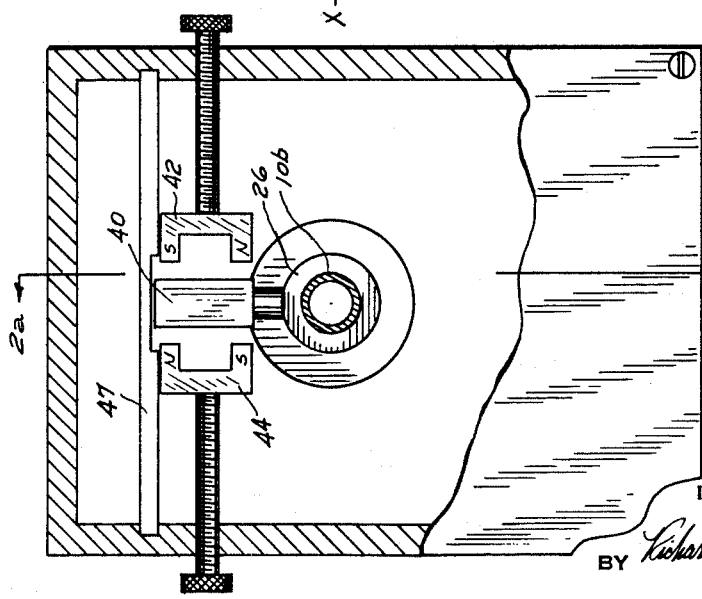

FIGS. 2a and 2b illustrate a modified form of the invention in which a T-shaped jet pipe 10 is provided with a rigid, hollow, transverse upper cross member forming a pair of coaxial left and right mounting arms 10a and 10b, one of which (10a) is rotatably mounted in guide bearing 13' carried in body 20, and the other of which is fixedly attached at 19 to one end of a coaxial torque tube 12, the other end of torque tube 12 being fixedly attached to body 20 at 25. Jet pipe 10 will be seen to be connected to the stationary housing through arm 10b and tube 12, so that the spring rate governing rotation of the jet pipe is that of tubes 10b and 12 in series, resulting in a lower spring rate than if tube 10b were attached directly to the housing, and avoiding the use of a long single torsion tube, which would tend to bend and improperly position the jet pipe nozzle with respect to the receiver ports. A further guide bearing 26 serves to align arm 10b of the jet pipe with torque tube 12, thereby to prevent rotation of the jet pipe about any axis other than axis x—x. The input signal force or displacement may be connected at hole 27' to rigid lever arm 27 extending from jet pipe 10, or alternatively, end 10a of jet pipe 10 may protrude through body 20 as shown at 28 to receive a rotary input torque or angle signal. As in FIGS. 1a and 1b, the magnetic compensating means comprises an armature 40 of magnetic material disposed between a pair of permanent magnets 42, 44, only one of which is shown in FIG. 2a. Non-magnetic bar 47 extends across the body of the apparatus to abut magnets 42, 44 and thereby prevent rotation of the magnets as they are translated inwardly or outwardly by rotation of their respective adjusting screws. In view of the description of the operation of the device of FIGS. 1a and 1b, operation of the device of FIGS. 2a and 2b should be apparent without further explanation.

FIG. 3 illustrates a further embodiment of the invention in which jet pipe 10 is rigidly connected to lever arm 27', one end of which is provided with a magnetic force element 51 such as a magnet or a magnet winding which cooperates with a stationary force-producing magnetic coil 52, so that energization of winding 52 and/or member 51 serves to apply a force to arm 27, and thereby rotate jet pipe 10. If magnetic force element 51 comprises an armature of unmagnetized magnetic material, the force applied to arm 27, which is always an attractive force, varies in direct proportion to the current through coil 52. In devices where element 51 is a permanently magnetized core, the force varies proportionally to the current through coil 52 but the force may be either attractive or repulsive. In devices where element 51 is a coil electrically connected in series with coil 52, the force varies in accordance with the square of the current through the coils, and the force may be either attractive or repulsive. Arm 27' and jet pipe 10 are pivotally mounted by means of flexure pivot 53 which comprises two mutually perpendicular flexible strips 53a, 53b, one end of each strip being affixed to jet pipe 10 and arm 27, and the other end of each strip being fastened to the stationary body of the jet pipe amplifier assembly. As will be clear from FIG. 3, forces produced by currents in assembly 51, 52 will tend to rotate jet pipe 10 and arm 27 about an axis perpendicular to the plane of the paper in FIG. 3 and passing through point A, the intersection of flexure strips 52a, 53b. It will be seen that the rotational force applied to jet pipe 10 by assembly 51, 52 will be opposed by the opposing spring force of flexure pivot 53, by any spring force which may be developed by flexible supply hose 54 as the jet pipe rotates, and by any spring force which flexing of electrical conductors 56, 56 may cause if member 51 comprises a winding. Magnets 42, 44 acting on magnetic armature 40, which is rigidly attached to arm 27, are positioned to apply forces substantially equal to the resultant of the three mentioned opposing forces, so that the net force applied to jet pipe 10 is substantially only that provided by assembly 51, 52.

In the case of a simple pulling magnet in which the permeability and area of the magnetic circuit do not change, the force applied by the magnet to an object is inversely proportional to the square of the distance between the magnet and the object. FIG. 4 illustrates the force versus displacement characteristics of magnets 42 and 44 by means of curves #1 and #2, respectively, while curve #3, which is the algebraic sum of curves #1 and #2, illustrates the net force acting on the armature situated between the two magnets. It will be seen that the net force becomes quite non-linear at large deviations or displacements from the centered or zero displacement position, but that a fairly linear region exists near center position. Because flexure bearings and the other spring restraints on a jet pipe are not operated beyond their elastic limits, the forces they generate are substantially linear, and therefore in practicing the invention, only the linear position of the net force curve is utilized, by providing magnets of sufficient strength to provide sufficient compensating force with motion limited to typically about 10% of the air gap between the magnets. The effect of adjustment of the air gap may be seen readily from FIG. 4. Decreasing the spacing between the magnets amounts to shifting curve #1 rightwardly and curve #2 leftwardly, and increasing the spacing between the magnets has, of course, opposite effects. The magnets may be shifted together, either rightwardly or leftwardly, to adjust the zero signal input position of the jet pipe relative to the receiver ports, and thereby adjust the system "set point." The magnets may be spread apart to provide the same effect upon biasing spring "spring rate" as has been accomplished heretofore by substitution of a weaker spring, and vice versa. It will be seen that since system set point can be determined by shifting the magnetic means as a pair, that the set point biasing springs heretofore used in many jet pipe regulator systems may be eliminated, and whether or not such springs are used, adjustment of the air gap between the magnets may be used to adjust system spring rate, in a continuous sense.

As well as using permanent magnets, it is within the scope of the invention to utilize electromagnets to provide opposing spring forces applied to jet pipes. As shown in FIG. 5a, magnet cores, 42a and 44a are fixedly mounted to body 20 on a non-magnetic plate 57 and provided with windings 42b and 44b, respectively. Each winding is connected through a current controlling means shown as comprising a rheostat (59, 60) to a current source (not shown) connected to terminals 71, 72. By adjustment of rheostats 59 and 60 the currents through the electromagnet windings may be adjusted, so that the electromagnets of FIG. 5a need not be physically moved to effect adjustment. As shown in FIG. 5b, the electromagnets also may be connected in a bridge circuit with potentiometer 78 to proportion the flow of current between the two electromagnets, thereby to adjust the balance point of the magnetic means, and additional means such as rheostat 79 may be used to control the current through and the strength of, both electromagnets.

FIGS. 6a, 6b and 6c are plan, elevation and section views, respectively, showing a preferred magnet mounting and adjustment arrangement which may be used in positioning the invention.

In FIGS. 6a, 6b and 6c the magnet mounting and adjusting assembly will be seen to include a pair of stationary end plates 61, 62 which are fixedly mounted to stationary body 20 of the jet pipe amplifier, with a pair of parallel rods 63, 64 extending between plates 61, 62 to provide a guide track for a pair of traveling nut members 65, 66. Magnets 42, 44 are fixedly attached, as by means of a suitable cement, to traveling nut members 65, 66 respectively. A rotatable and axially slidable shaft 67 which slidably passes through block 61 is provided with oppositely-threaded portions 67a and 67b, and the right end of shaft 67 butts against pin 68, which is threaded through block 62 and locked in place by jam nut 69. A slot in the end of threaded pin 68 allows axial adjustment of pin 68 by means of a screwdriver. Spring means 70 urges traveling nut member 65, axially slidable shaft 67 and traveling nut member rightwardly, holding the end of shaft 67 against pin 68. As pin 68 is rotatably adjusted, it will be seen that magnets 42 and 44 will be moved together, thereby allowing adjustment of the set point of the apparatus. Because portions 67a and 67b are oppositely threaded, it will be seen that rotation of shaft 67 in one direction will operate to decrease the spacing between the magnets, while rotation in the opposite direction will serve to increase the spacing, thereby allowing adjustment of the system gain.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A jet-pipe hydraulic amplifier, comprising, in combination: a body defining an enclosed cavity and having a pair of receiver ports spaced in a wall thereof; a jet pipe connected to a fluid pressure source and adapted to expel fluid toward said receiver ports, said jet pipe being mounted within said cavity and pivotally attached to said body by flexible suspension means; means for applying an input signal force to said jet pipe tending to pivot said jet pipe against restraining forces developed by said suspension means; an armature of magnetic material rigidly attached to said jet pipe; and a pair of mutually opposing magnetic means spaced on opposite sides of said armature to apply opposing forces to said armature to tend to rotate said jet pipe from a reference position of unstable equilibrium produced by application of said opposing forces to said jet pipe by said magnetic means.

2. Apparatus according to claim 1 in which said jet pipe comprises a T-shaped hollow tube having coaxial left and right arms and a third arm perpendicular thereto, one of said coaxial arms being rotatable journalled in said body, the second of said coaxial arms being connected to said body through a hollow torque tube, said third arm extending from the junction of said left and right arms and terminating in a nozzle.

3. Apparatus according to claim 2 in which said hollow torque tube is disposed coaxially with said left and right arms, and in which said apparatus includes rotary bearing means disposed between said torque tube and said second of said coaxial arms.

4. A jet-pipe hydraulic amplifier, comprising, in combination: a stationary body defining an enclosed cavity and having a pair of receiver ports spaced in a wall thereof; a pivotable jet pipe connected to a fluid pressure source and adapted to expel fluid toward said receiver ports, thereby to proportion the flow of fluid to the respective ports as said jet pipe is pivoted, said jet pipe being mounted within said cavity and pivotally attached to said body by means of a flexible suspension means adapted to resiliently oppose pivotal movement of said jet pipe away from a reference position; an armature of magnetic material rigidly attached to said jet pipe; and a pair of magnetic means spaced on opposite sides of said armature to apply forces to said armature to oppose the forces applied to said jet pipe by said flexible suspension means.

5. Apparatus according to claim 4 in which each of said magnetic means comprises an electromagnet connected through a variable resistance to a source of electrical current.

6. Apparatus according to claim 5 in which said electromagnets are connected through first and second respective variable resistances to allow independent adjustment of the currents through said electromagnets.

7. Apparatus according to claim 5 in which said electromagnets are connected in a bridge circuit with a potentiometer operable to proportion the flow of current between said electromagnets, and a second variable resistance connected to control the flow of current to said bridge circuit.

8. Apparatus according to claim 1 in which said flexible suspension means comprises a hollow tube having its ends fixedly attached to said body, in which said jet pipe extends perpendicularly from the side of said tube, and in which said fluid pressure source is connected to said jet pipe through said hollow torque tube.

9. Apparatus according to claim 1 in which said jet pipe is pivotable through a limited distance and in which said magnets are spaced with respect to said armature so that said armature traverses less than 20% of the distance between said magnets as said jet pipe is pivoted through said limited distance.

10. Apparatus according to claim 1 having an actuating arm rigidly attached to said jet pipe, and further magnetic means, electrically connected to an external circuit and mechanically connected to said jet pipe for applying an external signal force to said jet pipe.

11. Apparatus according to claim 4 in which said permanent magnets are substantially equal in magnetomotive force and symmetrically disposed on opposite sides of said armature, with the poles of one magnet facing opposite polarity poles of the other magnet.

12. In a jet-pipe servomechanism system which includes a pivotally-mounted jet pipe connected to a fluid pressure source and operable to proportion the flow of fluid to a pair of receiver ports to provide a differential pressure signal, expansible chamber motive means operated by said differential pressure signal to control a load and feedback means responsive to operation of said motive means for rebalancing said jet pipe to a set point position; spring-rate compensating means, comprising, in combination: an armature of magnetic material rigidly attached to said jet pipe; a pair of mutually-opposing magnetic means spaced on opposite sides of said armature to apply forces to said armature; and means for varying the magnitudes of said forces applied to said armature to vary the loop gain of said servomechanism system.

13. Apparatus according to claim 4 including means for adjusting said pair of magnetic means conjointly as a pair with respect to said armature.

14. Apparatus according to claim 4 including means for adjusting said pair of magnetic means mutually oppositely with respect to said armature.

15. Apparatus according to claim 4 including first means for moving said magnetic means in the same direction to adjust the midpoint between said magnetic means without altering the distance between said magnetic means, and second means for moving said magnetic means in mutually opposite directions to adjust the distance between said magnetic means without altering the position of the midpoint between said magnetic means.

16. In a jet-pipe servomechanism system having a pivotally-mounted jet pipe connected to a fluid pressure source and operable to proportion the flow of fluid to a pair of receiver ports to provide a differential pressure signal, expansible chamber motive means operated by said differential pressure signal to control a load, and feedback means responsive to operation of said motive means for rebalancing said jet pipe to a set point position; spring-rate compensating means, comprising, in combination: an armature of magnetic material rigidly attached to said jet pipe; a pair of mutually-opposing magnetic means spaced on opposite sides of said armature to apply opposing forces to said armature; and means for varying the position between said magnetic means at which said forces applied to said armature cancel each other, thereby to vary said set point position of said servomechanism system.

References Cited in the file of this patent
UNITED STATES PATENTS

| | | |
|---|---|---|
| 1,620,707 | Wunsch | Mar. 15, 1927 |
| 2,601,207 | Jacques | June 17, 1952 |
| 2,699,356 | Ziebolz | Jan. 11, 1955 |
| 2,724,397 | Ziebolz | Nov. 22, 1955 |
| 2,990,839 | Ray | July 4, 1961 |
| 3,011,505 | Reip | Dec. 5, 1961 |
| 3,078,863 | Wolpin et al. | Feb. 26, 1963 |